(12) United States Patent
Sakai

(10) Patent No.: US 9,013,411 B2
(45) Date of Patent: Apr. 21, 2015

(54) TOUCH PANEL DEVICE HAVING AN OUTER EDGE FRAME BODY, AN ELECTRO-OPTICAL DEVICE USING THE SAME, AND AN ELECTRONIC APPARATUS USING THE SAME

(75) Inventor: Toyohiro Sakai, Azumino (JP)

(73) Assignee: Japan Display Inc., Tokyo (JP)

( * ) Notice: Subject to any disclaimer, the term of this patent is extended or adjusted under 35 U.S.C. 154(b) by 571 days.

(21) Appl. No.: 12/610,414

(22) Filed: Nov. 2, 2009

(65) Prior Publication Data

US 2010/0110033 A1   May 6, 2010

(30) Foreign Application Priority Data

Nov. 6, 2008   (JP) .................................. 2008-285079

(51) Int. Cl.
  *G06F 3/041*  (2006.01)
  *G06F 3/045*  (2006.01)
(52) U.S. Cl.
  CPC ...................................... *G06F 3/045* (2013.01)
(58) Field of Classification Search
  USPC ........................................................ 345/173
  See application file for complete search history.

(56) References Cited

U.S. PATENT DOCUMENTS

| | | | | |
|---|---|---|---|---|
| 2005/0099402 A1* | 5/2005 | Nakanishi et al. | ............ | 345/173 |
| 2005/0280635 A1* | 12/2005 | Hinata | ........................... | 345/173 |
| 2006/0098976 A1 | 5/2006 | Takahashi et al. | | |
| 2008/0007538 A1* | 1/2008 | Kotera et al. | .................. | 345/173 |
| 2008/0246741 A1* | 10/2008 | Hinata | ........................... | 345/173 |

FOREIGN PATENT DOCUMENTS

| | | |
|---|---|---|
| JP | 62-198627 | 5/1986 |
| JP | 10-207630 | 8/1998 |
| JP | 2003-256138 | 9/2003 |
| JP | 2006-004215 | 1/2006 |
| JP | 2006-085310 | 3/2006 |
| JP | 2006-134180 | 5/2006 |
| JP | 2008-262289 | 10/2008 |

OTHER PUBLICATIONS

Japanese Office Action issued Aug. 21, 2012, for corresponding Japanese Appln. No. 2008-285079.

* cited by examiner

*Primary Examiner* — Long D Pham
(74) *Attorney, Agent, or Firm* — K&L Gates LLP

(57) ABSTRACT

A touch panel device includes a touch panel that includes a first substrate, a second substrate that is arranged so as to face the first substrate with a gap interposed therebetween, a extension outer edge portion that is arranged in the first substrate and is formed so as to be extends the outer side relative to an outer edge portion of the second substrate, and a position detecting structure that is arranged in an area in which the first substrate and the second substrate overlap each other and a frame body that includes an opening portion used for exposing the second substrate of the touch panel. An opening edge portion of the opening portion is overlapped with the extension outer edge portion, and the opening edge portion directly or indirectly supports the extension outer edge portion from the second substrate side.

17 Claims, 5 Drawing Sheets

TOUCH PANEL DEVICE HAVING AN OUTER EDGE FRAME BODY, AN ELECTRO-OPTICAL DEVICE USING THE SAME, AND AN ELECTRONIC APPARATUS USING THE SAME

BACKGROUND

1. Technical Field

The present invention relates to a touch panel device, an electro-optical device, and an electronic apparatus.

2. Related Art

Generally, touch panels are coordinate inputting devices that input plane coordinates of a portion that is indicated by a finger, a pen, or the like to an electronic apparatus. The touch panels are arranged on a display screen of a display device such as a liquid crystal panel.

As for general detection methods for the touch panels there are various methods such as a resistive film method, an electrostatic capacitance method, and an ultrasonic wave-elastic wave method. Among these, for example, in the above-described resistive film method, conductive films having transparency are formed on opposing faces of two glass substrates that are arranged to face each other with a very small gap interposed therebetween, and the conductive films are brought into contact with each other so as to be in a conductive state for a case where the glass substrate located on the observation side is pressed by a finger, a pen, or the like on the observation side, and whereby an output, such as the corresponding voltage to the resistance value between both the conductive films is acquired. The touch panels of such a type are relatively inexpensive and are mainly used.

A general touch panel 10 of such a type will now be described in detail. As shown in FIG. 9, the touch panel 10 is configured by bonding first and second substrates 11 and 12 that are transparent and formed from glass, resin, or the like, together with a sealing member 15 formed from resin so as to be arranged to face each other with a very small gap interposed therebetween. On the faces of the first substrate 11 and the second substrate 12 that face each other, transparent conductive films 13 and 14 are formed. In addition, the first substrate 11 of the touch panel 10 is bonded to an observation-side substrate 22 of a liquid crystal panel 20, which includes substrates 21 and 22, by using an adhesive material 19.

In addition, a polarizing plate 28A of the liquid crystal panel 20 is attached to the outer face of the second substrate 12. The touch panel 10 is housed inside a frame body 40 that is formed by a case of an electronic apparatus and the like, and an operation face of the touch panel 10 is arranged so as to be exposed from an opening portion 40a of the frame body 40. At this moment, an opening edge portion 40b of the frame body 40 supports the peripheral edge portion of the second substrate 12 of the touch panel 10 from the upper side through a shock absorbing member 41 and the polarizing plate 28A. A support structure same as described above has been disclosed in JP-A-2006-134180.

However, in the support structure of the touch panel shown in FIG. 9, the opening edge portion 40b of the frame body 40 supports the second substrate 12 of the touch panel 10 through the shock absorbing member 41 and the polarizing plate 28A, and the second substrate 12 is formed so as to be able to be elastically deformed by the force generated by the pressing finger f (may be a member such as a pen). Thus, when an electronic apparatus in which the above-described touch panel 10 is mounted; it receives an impact by falling on the floor or the like, as denoted by a dashed-two dotted line shown in FIG. 9, the second substrate 12 is deformed, and the stress is concentrated on a support portion of the second substrate 12 that is supported by the opening edge portion 40b of the frame body 40. Accordingly, there is a problem that a crack forms from near a point P (an inner end portion of the support portion) for a case where the second substrate 12 is formed from brittle material such as glass. In addition, in a case where the second substrate 12 is formed from an elastic material such as a resin material, the second substrate 12 may be damaged, or the entire touch panel 10 may be deformed. In addition, since the opening edge portion 40b of the frame body 40 supports the second substrate 12 of the touch panel 10 through the shock absorbing member 41 and the polarizing plate 28A, the thickness of the touch panel device is increased, and the level difference between the frame body 40 and the polarizing plate 28A is visually distinguished. Accordingly, there is also a problem that the external appearance of the touch panel device is degraded.

SUMMARY

An advantage of some aspects of the invention is that it provides a touch panel device that can decrease damage in the substrates, configuring the touch panel and the deformation of the touch panel even for a case where external stress such as an impact is applied and has a small thickness and an improved appearance and an electro-optical device and an electronic apparatus in which the touch panel is mounted.

According to a first aspect of the invention, there is provided a touch panel device including: a touch panel that includes a first substrate, a second substrate that is arranged so as to face the first substrate with a gap interposed therebetween, a extension outer edge portion that is arranged in the first substrate and is formed so as to be extends the outer side relative to an outer edge portion of the second substrate, and a position detecting structure that is arranged in an area in which the first substrate and the second substrate overlap each other; and a frame body that includes an opening portion used for exposing the second substrate of the touch panel. An opening edge portion of the opening portion is overlapped with the extension outer edge portion, and the opening edge portion directly or indirectly supports the extension outer edge portion from the second substrate side.

According to the above-described touch panel device, the frame body supports the extension outer edge portion of the first substrate of the touch panel. Thus, even when external stress such as an impact is applied, the stress applied to the second substrate can be decreased, and the stress applied between the first substrate and the second substrate can be decreased as well. Accordingly, damage in the second substrate can be prevented, and deformation of the entire touch panel can be suppressed. In addition, the thickness of the touch panel device can be decreased by the amount of non-overlapping between the second substrate and the frame body, and the touch panel device that does not have a level difference between the surface of the second substrate side and the frame body and has improved appearance, can be realized.

In the above-described touch panel device, the rigidity of the first substrate may be configured to be higher than that of the second substrate. In such a case, the rigidity of the first substrate that is supported by the opening edge portion of the frame body can be increased while the touch panel is configured to be easily deformed for a case where the second substrate is pressed for acquiring the original function of the touch panel. Accordingly, resistance to impact, tolerance to deformation, and tolerance to other types of the external stress in the touch panel can be improved.

In the above-described touch panel device, it may be configured that the extension outer edge portion is formed so as to be extends the outer side relative to at least two outer edges of the second substrate facing each other. In this case, the opening edge portion directly or indirectly supports the extension outer edge portion on the outer sides of the two outer edges. In such a case, the extension outer edge portion of the first substrate is extends the outer side relative to the two outer edges of the second substrate facing each other, and the extension outer edge portion is supported by the opening edge portion on the outer side of the two outer edges. As a result, the touch panel can be supported more stably and assuredly.

However, the support portion of the extension outer edge portion of the first substrate, which is supported by the opening edge portion of the frame body, according to an embodiment of the invention is not particularly limited. Thus, it may be configured that at least one spot of the extension outer edge portion is supported directly or indirectly. In addition, when the first substrate and the second substrate have a rectangular shape in the plan view, it is preferable that the extension outer edge portion is supported on the sides of two sides that face each other. However, the extension outer edge portion may be supported along one specific side or may be supported on the sides of two adjacent sides. First of all, apparently it is preferable that the extension outer edge portion of the first substrate is arranged over the entire periphery on the outer side of the second substrate, and the opening edge portion of the frame body supports the extension outer edge portion over the entire periphery. In addition, apparently, it is preferable that the extension outer edge portion is supported on all four sides of the above-described rectangle.

In addition, the above-described touch panel device may further include an opposite-side support portion that supports the extension outer edge portion on the side opposite to the operation side and is formed to be integrated with or separated from the frame body. In such a case, since the opposite-side support portion that supports the extension outer edge portion from the side opposite to the operation side is included, the first substrate of the touch panel is supported on both sides by the opening edge portion of the frame body and the opposite-side support portion. Accordingly, external stress such as an impact is additionally concentrated on the extension outer edge portion of the first substrate. As a result, the damage or deformation of the second substrate or the entire touch panel can be decreased further.

In addition, according to an embodiment of the invention, it may be configured that the opening edge portion of the frame body and the extension outer edge portion of the first substrate are directly brought into contact with each other, and the extension outer edge portion of the first substrate and the opposite-side support portion of the frame body are directly brought into contact with each other. Alternatively, on one side or both sides of a space between the opening edge portion of the frame body and the extension outer edge portion of the first substrate and a space between the extension outer edge portion of the first substrate and the opposite-side support portion, a shock absorbing member, a double-sided tape, an elastic member such as a packing, or any other member may be interposed.

According to the second aspect of the invention, there is provided an electro-optical device including: a touch panel that includes a first substrate, a second substrate that is arranged so as to face the first substrate with a gap interposed therebetween, a extension outer edge portion that is arranged in the first substrate and is formed so as to be extends the outer side relative to an outer edge portion of the second substrate, and a position detecting structure that is arranged in an area in which the first substrate and the second substrate are overlapped with each other; an electro-optical panel that is arranged on the first substrate side of the touch panel; and a frame body that includes an opening portion used for exposing the second substrate of the touch panel. An opening edge portion of the opening portion is overlapped with the extension outer edge portion, and the opening edge portion directly or indirectly supports the extension outer edge portion from the second substrate side.

According to the above-described electro-optical device, the frame body supports the extension outer edge portion of the first substrate of the touch panel. Thus, even when external stress such as an impact is applied, the stress applied to the second substrate can be decreased, and the stress applied between the first substrate and the second substrate can be decreased, as well. Accordingly, the damage in the second substrate can be prevented, and the deformation of the entire touch panel can be suppressed. In addition, the thickness of the electro-optical device can be decreased by the amount of non-overlapping between the second substrate and the frame body, and the electro-optical device that does not have a level difference between the surface of the second substrate side and the frame body and has improved appearance can be realized.

As for the above-described electro-optical panel, there are a liquid crystal display (LCD), an organic electroluminescence (EL) display, a microcapsule-type electrophoretic display (EPD), and the like.

In the above-described electro-optical device, the rigidity of the first substrate may be configured to be higher than that of the second substrate. In such a case, the rigidity of the first substrate that is supported by the opening edge portion of the frame body can be increased while the touch panel is configured to be easily deformed in the case where the second substrate is pressed for acquiring the original function of the touch panel. Accordingly, in the touch panel, resistance to impact, tolerance for deformation, and tolerance for other types of external stress can be improved.

In the above-described electro-optical device, it may be configured that the extension outer edge portion is formed so as to be extends the outer side relative to at least two outer edges of the second substrate facing each other. In this case, the opening edge portion directly or indirectly supports the extension outer edge portion on the outer sides of the two outer edges. In such a case, the extension outer edge portion of the first substrate is extends the outer side relative to two outer edges of the second substrate facing each other, and the extension outer edge portion is supported by the opening edge portion on the outer side of the two outer edges. As a result, the touch panel can be supported more stably and assuredly.

In the above-described electro-optical device, it may be configured that the first substrate is directly or indirectly supported by the electro-optical panel from the side opposite to the operation side. In such a case, since the electro-optical panel supports the extension outer edge portion of the first substrate from the side opposite to the operation side, the first substrate of the touch panel is supported on both sides by the opening edge portion of the frame body and the above-described electro-optical panel. Accordingly, external stress such as an impact is concentrated on the first substrate. As a result, the damage or deformation of the second substrate or the entire touch panel can be decreased further.

In addition, the above-described electro-optical device may further include an opposite-side support portion that supports the extension outer edge portion on the side opposite to the operation side and is formed to be integrated with or separated from the frame body. In such a case, since the opposite-side support portion that supports the extension outer edge portion from the side opposite to the operation side is included, the first substrate of the touch panel is supported on both sides by the opening edge portion of the frame body and the opposite-side support portion. Accordingly, external stress such as an impact is additionally concentrated on the outer peripheral portion of the first substrate. As a result, damage or deformation of the second substrate or the entire touch panel can be decreased further. In addition, since the extension outer edge portion is extends the outer side of the electro-optical panel, the extension portion can be assuredly supported by the opposite-side support portion.

In such a case, it is preferable that a support portion of the extension outer edge portion that is supported by the opening edge portion and a support portion of the extension outer edge portion that is supported by the opposite-side support portion at least partially overlap each other in the plan view. In this case, a supporting force for the first substrate that is received by the opening edge portion of the extension outer edge portion of the first substrate and a supporting force that is received by the opposite-side support portion are applied in the thickness direction of the extension outer edge portion. Accordingly, bending stress cannot be easily generated on the first substrate. As a result, in the electro-optical device, resistance to impact, tolerance for deformation, and tolerance for other types of external stress can be improved further.

According to the third aspect of the invention, there is provided an electronic apparatus including the above-described electro-optical and a control unit that controls the electro-optical device. The above-described electronic apparatus is not particularly limited. However, the above-described electronic apparatus is particularly effective as an apparatus such as a mobile-type electronic apparatus including a cellular phone, an electronic watch, a mobile information terminal, or the like that has a high possibility for receiving an impact such as a fall.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
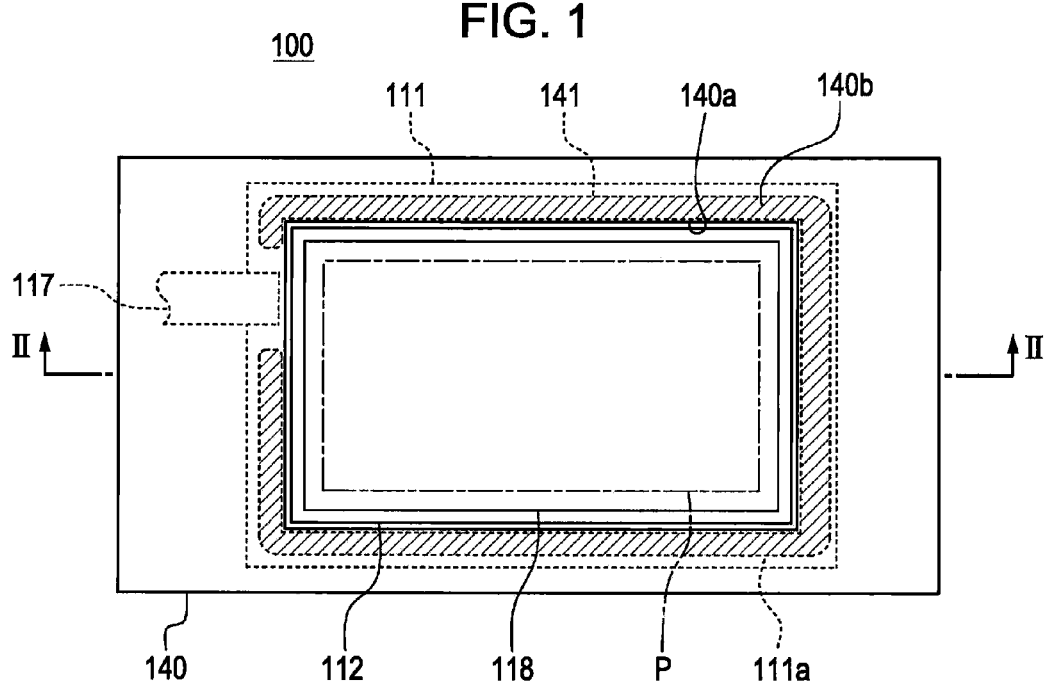
FIG. 1 is a schematic plan view schematically showing an electro-optical device according to a first embodiment of the invention.
Figure 2:
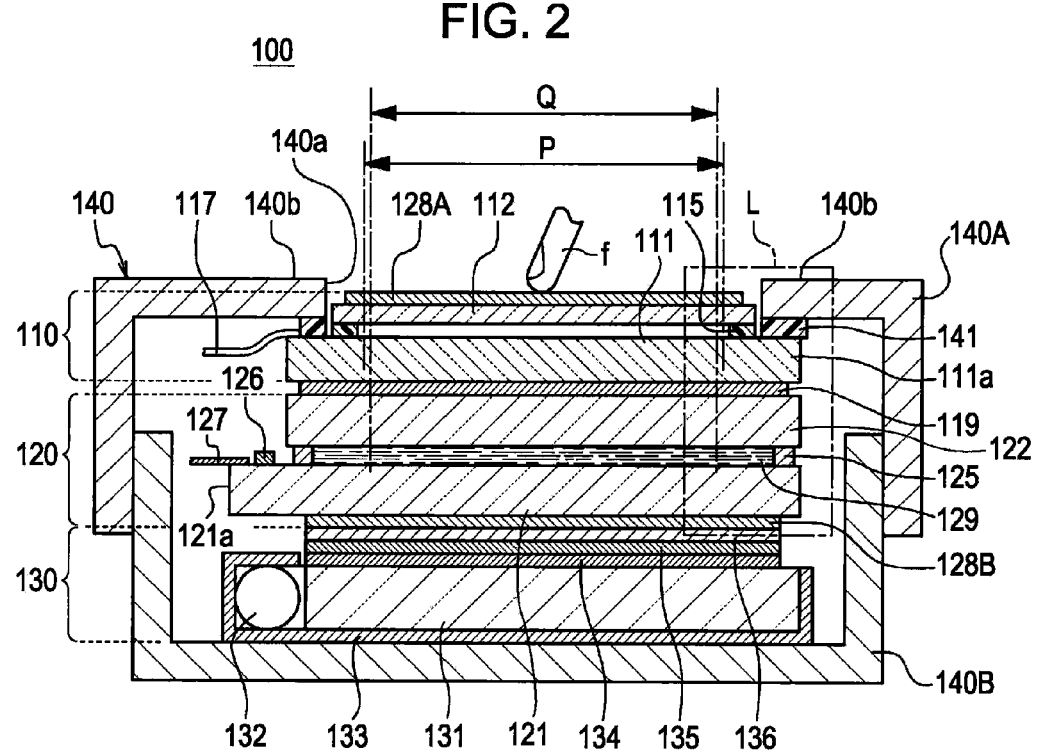
FIG. 2 is a schematic longitudinal cross-sectional view taken along line II-II shown in FIG. 1.
Figure 3:
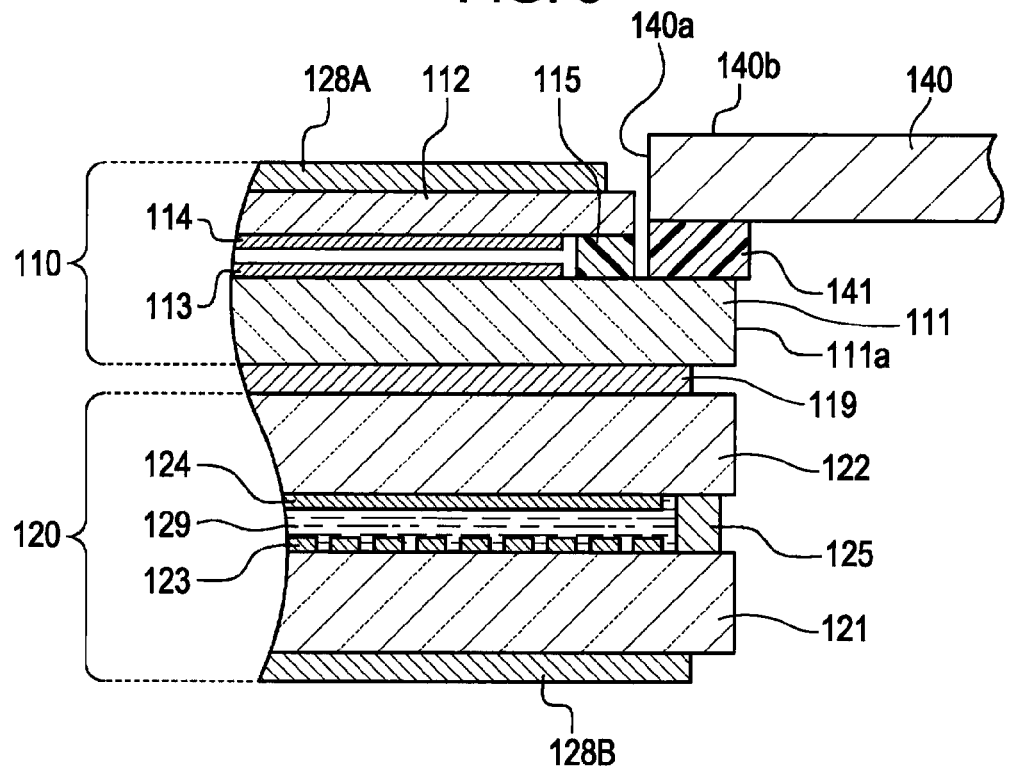
FIG. 3 is a schematic enlarged view showing a portion L that is surrounded by a dashed-dotted line in FIG. 2 in an enlarged scale.

Hereinafter, a touch panel device, an electro-optical device, and an electronic apparatus according to the embodiments of the invention will be described in detail with reference to the accompanying drawings.
First Embodiment FIG. 1 is a schematic plan view schematically showing a touch panel device or an electro-optical device according to a first embodiment of the invention. FIG. 2 is a schematic longitudinal cross-sectional view taken along line II-II shown in FIG. 1. FIG. 3 is a schematic enlarged view showing a portion L that is surrounded by a dashed-dotted line in FIG. 2 in an enlarged scale.

As shown in FIG. 2, the electro-optical device 100 includes a touch panel 110, a liquid crystal panel 120 that is arranged so as to be overlapped with the rear face side of the touch panel 110, a back light 130 that is arranged on the rear face side of the liquid crystal panel 120, and a frame body 140 that houses and holds the touch panel 110, the liquid crystal display device 120, and the back light 130. The electro-optical device 100 according to this embodiment also corresponds to the above-described touch panel device.

As shown in FIGS. 2 and 3, the touch panel 110 includes a first substrate 111 and a second substrate 112 that are attached together so as to face each other through a sealing member 115 that is formed of resin or the like. There is a gap between the first substrate 111 and the second substrate 112. In addition, transparent conductive films 113 and 114 (a position detecting structure) formed of indium tin oxide (ITO) or the like are formed on faces of the first substrate 111 and the second substrate 112 which face each other. Electrodes not shown in the figure are arranged in the conductive films 113 and 114. In addition, wirings are drawn out from the electrodes and are connected to a wiring formed within a wiring member 117 that is formed of a flexible printed circuit (FPC) or the like. This wiring member 117 is mounted on an end portion of the first substrate 111 and is extends toward the outside of the first substrate 111.

When the touch panel 110 is arranged so as to be overlapped with the viewing side of a display body, same as in this embodiment, the first substrate 111 and the second substrate 112 are formed of a material having at least transparency, and is preferably formed of transparent glass, transparent resin, or the like. In addition, the first substrate 111 and the second substrate 112 may be formed of the same material or different materials.

The second substrate 112 is deformed by a pressing force so as to bring the conductive film 114 formed on the second substrate 112 into contact with the conductive film 113 formed on the first substrate 111, and thereby the touch panel 110 detects a position. Thus, commonly, the second substrate 112 is configured to have rigidity (in particular, the rigidity in the thickness direction) lower than that of the first substrate 111. In other words, it is preferable that the second substrate 112 has flexibility so as to be easily deformed in the thickness direction by a finger f. In addition, it is preferable that the first substrate 111 has rigidity (in particular, the rigidity in the thickness direction) so as not to be easily deformed in the thickness direction, compared to the second substrate. Particularly in this embodiment, when the rigidity of the first substrate 111 is increased by a holding structure to be described later, the amount of deformation of the touch panel 110 at the time of receiving of external stress can be decreased, and accordingly, it is effective to acquire the reliability of the electro-optical device.

In the example shown in the figure, the first substrate 111 and the second substrate 112 are formed of the same material (for example, glass). In addition, the thickness of the second substrate 112 is configured to be thinner than that of the first substrate 111, and whereby the rigidity needed for the first substrate 111 and the flexibility needed for the second substrate 112 are realized.

According to this embodiment, the first substrate 111 has an extension outer edge portion 111a that is extends from the outer edge of the second substrate 112 to the outer side. This extension outer edge portion 111a is formed in the periphery of the second substrate 112 over the entire periphery.

Described in more details, as shown in FIG. 1, the first substrate 111 and the second substrate 112 has a rectangular shape in the plan view. The touch panel 110 also has a rectangular shape in the plan view. The first substrate 111 is extends from a plane area overlapped with the second substrate 112 to the periphery thereof, and the extension outer edge portion 111a is arranged on the outer side of each side of the second substrate 112. In other words, the extension outer edge portion 111a exists in any side of the second substrate 112. In the example shown in the figure, the extension outer edge portion 111a is integrally formed in a rectangular frame shape so as to surround the second substrate 112.

Next, as shown in FIG. 2, the liquid crystal panel 120 is formed by bonding a transparent substrate 121 and a substrate 122 together through a sealing member 125 and sealing a liquid crystal 129 between both the substrates. On one substrate 121, a substrate extension portion 121a that is extends from the outer edge of a one-side end portion of the other substrate 122 to the outer side is arranged. In addition, in this substrate extension portion 121a, a wiring member 127 that is formed of a liquid crystal driving chip 126, an FPC, and the like is mounted.

In addition, on opposing faces of the substrate 121 and the substrate 122, transparent electrodes 123 and 124 that are formed of ITO or the like are formed. These transparent electrodes 123 and 124 are electrically connected to the liquid crystal driving chip 126 and the FPC 127 on the substrate extension portion 121a.

In the liquid crystal panel 120, one pair of polarizing plates 128A and 128B are arranged on both sides of the liquid crystal 129. In the example shown in the figure, one polarizing plate 128A is arranged (attached) on the outer face of the second substrate 112 of the touch panel 110, and the other polarizing plate 128B is arranged (attached) on the outer face of the substrate 121.

In the example shown in the figure, the substrate 122 of the liquid crystal panel 120 and the first substrate 111 of the touch panel 110 are bonded together so as to be fixed by a transparent adhesive agent 119. Accordingly, the touch panel 110 is supported by the liquid crystal panel 120 from the side opposite to the observation side (operation side). According to this embodiment, the touch panel 110 and the liquid crystal panel 120 are bonded together so as to be fixed by the adhesive agent 119. However, it may be configured that the touch panel 110 is only disposed on the liquid crystal panel 120, and thereby the touch panel 110 is supported by the liquid crystal panel 120 on the above-described opposite side.

In addition, a detection area P of the touch panel 110 and a display area Q of the liquid crystal panel 120 are set to approximately coincide (be overlapped in the plan view) with each other in the plan view. Accordingly, the display area Q of the liquid crystal panel 120 is arranged so as to be overlapped with the rear side of the detection area P of the touch panel 110. Accordingly, any arbitrary position within the detection area P of the touch panel 110 can be operated by the finger f in accordance with a displayed image within the display area Q.

Next, in the backlight 130, a light guiding plate 131 is arranged on the rear side of the liquid crystal panel 120, and a side of the light guiding plate 131 that is located on the liquid crystal panel 120 side is used as a light outgoing face. On an incident light face that is an end edge adjacent to the light outgoing face, a light source 132 such as a light emitting diode (LED) or a cold-cathode tube is arranged adjacently. In addition, on the rear side (the side opposite to the liquid crystal panel 120) of the light guiding plate 131, a light reflecting plate 133 is arranged. In addition, on the liquid crystal panel 120 side of the light guiding plate 131, various optical sheets such as two prism sheets 134 and 135, an optical diffusion plate 136, and the like are arranged.

The frame body 140 is used for holding the touch panel 110, the liquid crystal panel 120, and the back light 130. In the example shown in the figure, the frame body 140 is configured by engaging a front frame body 140A and a rear frame body 140B together in the thickness direction. However, the configuration of the frame body 140 is not limited thereto. For example, it may be configured that the rear frame 140B shown in the figure holds the touch panel 110, the liquid crystal panel 120, and the back light 130 on the observation side (the operation side of the touch panel 110, and the upper side in FIG. 2; hereinafter, means the same), and the front frame body 140A that is configured by a part of a case of the electronic device holds an additional touch panel 110 on the observation side.

As shown in FIGS. 1 and 2, on the observation side of the frame body 140, an opening portion 140a is formed. On the inner side of the opening portion 140a, the second substrate 112 of the touch panel 110 is arranged. An opening edge portion 140b of the opening portion 140a faces the extension outer edge portion 111a that is disposed on the first substrate 111 of the touch panel 110 and supports the first substrate 111 from the observation side through a shock absorbing member 141 that is formed of resin having a shock absorbing function such as a gel sheet.

The opening shape of the opening portion 140a, as described above, is a rectangular shape in the plan view and exposes the entire second substrate 112 of the touch panel 110. In the example shown in the figure, the outer edge of the second substrate 112 is configured so as not to be brought into contact with the opening edge portion 140b. In addition, the opening edge portion 140b is arranged on the observation side of the extension outer edge portion 111a of the touch panel 110 and covers the entire periphery of the extension outer edge portion 111a having the rectangular frame shape.

The above-described shock absorbing member 141 is arranged so as to avoid a portion of the opening edge portion 141a to which the wiring member 117 of the touch panel 110 is connected. In the example shown in the figure, the shock absorbing member 141 is formed approximately in the shape of the letter "C" in the plan view that extends over four sides of the touch panel 110 along the opening edge portion 140b. Accordingly, a support force due to the opening edge portion 140b of the frame body 140 is configured not to be applied to the connection portion of the wiring member 117. This is for preventing poor connection that is caused by external stress applied to the connection portion of the wiring member 117.

In the electro-optical device 100 configured as described above, the extension outer edge portion 111a of the first substrate 111 of the touch panel 110 is supported by the opening edge portion 140b of the frame body 140 on the observation side. Accordingly, when external stress such as an impact force is applied to the touch panel 110 from the observation side, most of the external stress can be received by the first substrate 111. Therefore, the external stress applied to the second substrate 112, which has low rigidity (the rigidity in the thickness direction) for acquiring the function of the touch panel 110, can be decreased, and thereby damages or cracks in the second substrate 112 can be prevented.

In particular, as in this embodiment when the rigidity of the first substrate 111 is higher than that of the second substrate 112, the touch panel 110 is supported by the first substrate 111 that has higher rigidity, and thereby an advantage that the above-described advantage can be improved further can be acquired. In other words, even when the same external force is received, the degree of damage or deformation of the first substrate 111 for a case where the external stress is received by the first substrate 111 is lower than that of the second substrate 112 for a case where the external force is received by the second substrate 112.

In addition, the extension outer edge portion 111a of the first substrate 111 that is located on a side (the side opposite to the operation side of the touch panel, and a lower side in FIG. 2; hereinafter, means the same) of the touch panel 110 opposite to the observation side is supported by the opening edge portion 140b from the observation side. Accordingly, the stress received by the touch panel 110 from the opening edge portion 140b is directly applied to the first substrate 111. Therefore, it is difficult to generate pressure for causing panel deformation between the first substrate 111 and the second substrate 112, and whereby occurrence of a problem due to deformation of the touch panel 110 can be prevented.

In particular, according to this embodiment, although the touch panel 110 is supported by the liquid crystal panel 120 from the side opposite to the observation side, the supporting force of the liquid crystal panel 120 is also applied to the first substrate 111. Accordingly, the supporting force received from one side located on the side of the touch panel 110 opposite to the observation side is also applied to the first substrate 111. As a result, the damage of the second substrate 112 or the deformation of the panel can be prevented more assuredly.

In addition, according to this embodiment, the second substrate 112 of the touch panel 110 is arranged on the inner side of the opening portion 140a so as not to be brought into contact with the opening edge portion 140b, and therefore the external stress is scarcely applied to the second substrate 112. However, even when a structure in which the opening edge portion 140b is indirectly brought into contact with the second substrate 112 is used, for example, by coating the outer peripheral portion of the second substrate 112 by using an additional covering plate or the like that is fixed to the frame body 140, the above-described advantages including a decrease in the damage of the second substrate 112 can be acquired to some degree as long as the opening edge portion 140b supports the extension outer edge portion 111a of the first substrate 111.

Figure 9:
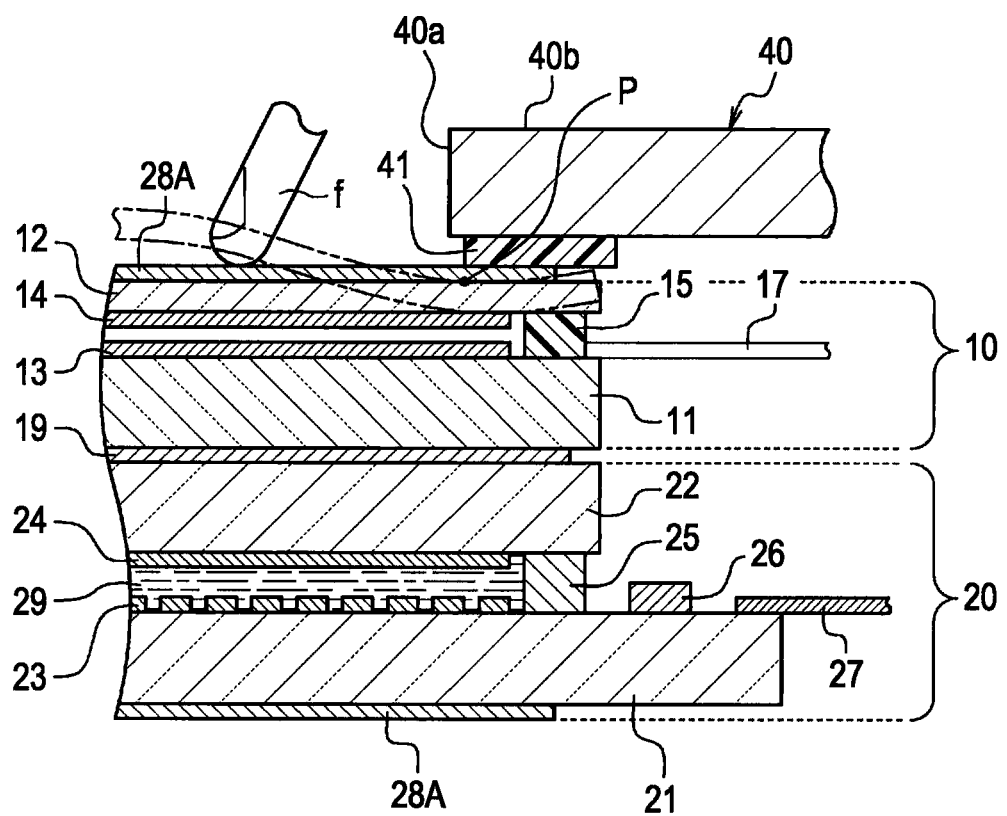
FIG. 9 is a schematic longitudinal cross-sectional view partially showing a part of a support structure of a touch panel of a general electro-optical device.

In addition, according to this embodiment, the opening edge portion 140b of the frame body 140 supports the first substrate 111 located on the side opposite to the observation side, and accordingly, the position of the outer face of the opening edge portion 140b can be arranged to the first substrate 111 side by a thickness of the second substrate 112 and the sealing member 115, compared to the general structure shown in FIG. 9. Accordingly, there is an advantage that a thin device can be acquired. In addition, a level difference between the second substrate 112 and the opening edge portion 140b of the frame body 140 can be decreased. Therefore, an advantage that the external appearance is improved can be acquired.

According to this embodiment, the extension outer edge portion 111a of the first substrate 111 is supported by the opening edge portion 140b rather than the observation side and is also supported by the liquid crystal panel 120 from the side opposite to the observation side. However, a support spot supported by the opening edge portion 140b and a support spot supported by the liquid crystal panel 120 are configured to be at least partially overlapped with each other in the plan view, and accordingly, it is difficult to add bending stress to the first substrate 111 that is supported on both sides. As a result, the direction of the pressing force that is received by the first substrate 111 becomes the thickness direction. Accordingly, resistance to impact, tolerance for deformation, and tolerance for other types of the external stress can be improved in the touch panel 110. As a result, the occurrence of a defect in the touch panel 110 can be prevented.

According to this embodiment, the extension outer edge portion 111a is integrally formed so as to be extends over the entire periphery on the outer side of the outer edge of the second substrate 112. However, the extension outer edge portion 111a may be arranged in at least a part of the periphery. In addition, a plurality of the extension outer edge portions 111a that is separated from one another may be arranged. However, it is apparent that the existence of the support portions of the opening edge portions 140b for the extension outer edge portions 111a on the entire outer sides of two outer edges of the second substrates 112 that face each other is preferable for stabilizing the support of the opening edge portions 140b and acquiring assured support.

In addition, according to this embodiment, the support portion of the extension outer edge portion 111a of the outer periphery of the touch panel 110 that is supported by the opening edge portion 140b extends along the outer edge of the second substrate 112. However, the above-described support portion does not need to extend as described above. However, as will be described later, when the support portions are formed in a scattered manner instead of the form in which the support portions extend along the sides, it is preferable that three or more support portions are arranged in the viewpoint of stability of support.

Second Embodiment

Figure 4:
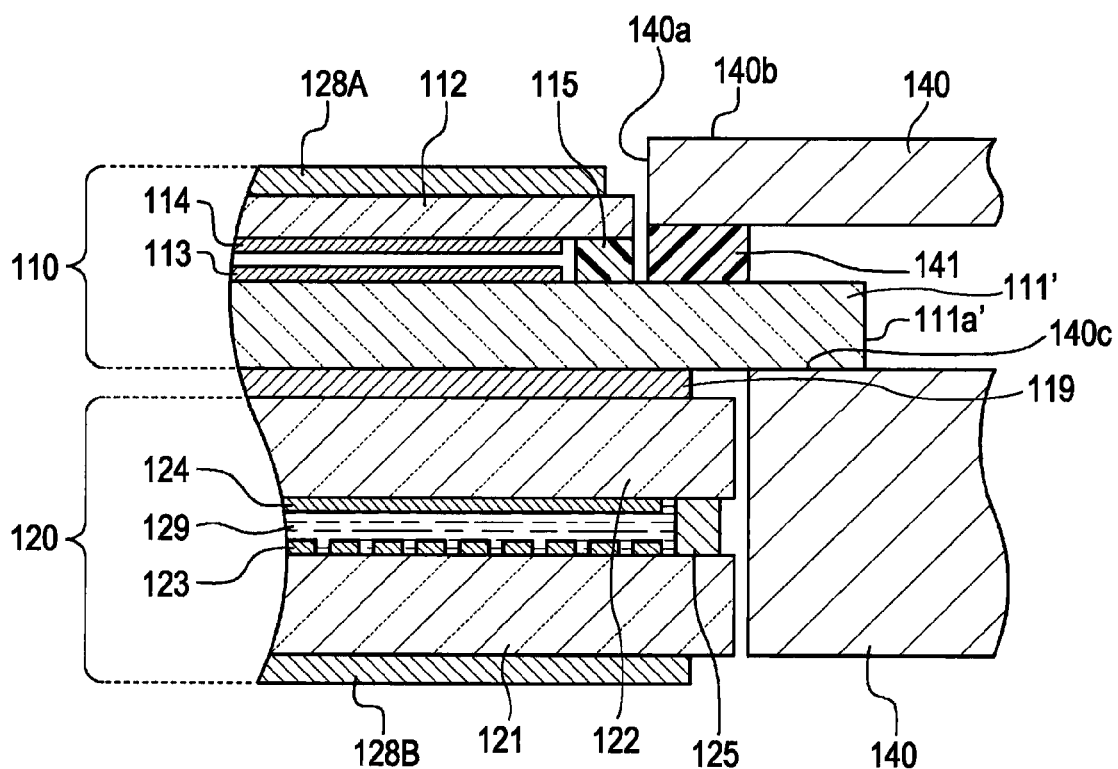
FIG. 4 is a schematic longitudinal cross-sectional view partially showing a part of a support structure of a touch panel of an electro-optical device according to a second embodiment of the invention.

Next, a touch panel device or an electro-optical device according to a second embodiment of the invention will be described with reference to FIG. 4. FIG. 4 is a schematic longitudinal cross-sectional view partially showing a part of a support structure of a touch panel of the electro-optical device according to the second embodiment. Here, a same reference sign is assigned to each part that is the same as that of the first embodiment, and a description thereof will be omitted here.

According to the first embodiment, the opening edge portion 140b of the frame body 140 supports the first substrate 111 of the touch panel 110 from the observation side, and the liquid crystal panel 120 supports the first substrate 111 from the side opposite to the observation side. According to this second embodiment, the support form of the opening edge portion 140b on the observation side for a first substrate 111' is the same as that of the first embodiment. However, in the support form on the side opposite to the observation side, an opposite-side support portion 140c that is a part of the frame body 140 is brought into contact with the first substrate 111' for supporting the first substrate 111', which is different from that of the first embodiment. In addition, according to this embodiment, a extension outer edge portion 111a' of the first substrate 111' of the touch panel 110 is supported by being pinched by the frame body 140 on the front and rear sides.

The first substrate 111' of the touch panel 110 according to this embodiment includes a extension outer edge portion 111a' that is extends to the outer side relative to the outer appearance of the liquid crystal panel 120. The above-described opposite-side support portion 140c is arranged on the outer side of the liquid crystal panel 120 and supports the extension outer edge portion 111a' from the side opposite to the observation side.

According to the second embodiment, the extension outer edge portion 111a' of the first substrate 111' is pinched by the opening edge portion 140b of the frame body 140 and the opposite-side support portion 140c from both the front and rear sides, and accordingly, the first substrate 111' can be supported firmly with high accuracy from both the front and rear sides. In addition, the support portion is limited to the peripheral edge portion of the touch panel 110, and accordingly, the influence of external stress on the detection area of the touch panel 110 and the display area of the liquid crystal panel 120, for example, deformation of such areas or generation of defects therein can be decreased.

In addition, according to this embodiment, the opening edge portion 140b and the opposite-side support portion 140c have support faces in opposite directions. Thus, when the frame body 140 is configured by engaging the front frame 140A and the rear frame 140B in the thickness direction as shown in FIG. 2, an assembly operation thereof can be performed in an easy manner by arranging the opening edge portion 140b in the front frame 140A and arranging the opposite-side support portion 140c in the rear frame 140B.

In addition, according to this embodiment, the opposite-side support portion 140c is configured as a part of the frame body 140. However, the opposite-side support portion 140c may be configured as a body separated from the frame body 140 as long as it supports the extension outer edge portion from the side opposite to the opening edge portion.

Third Embodiment

Figure 5:
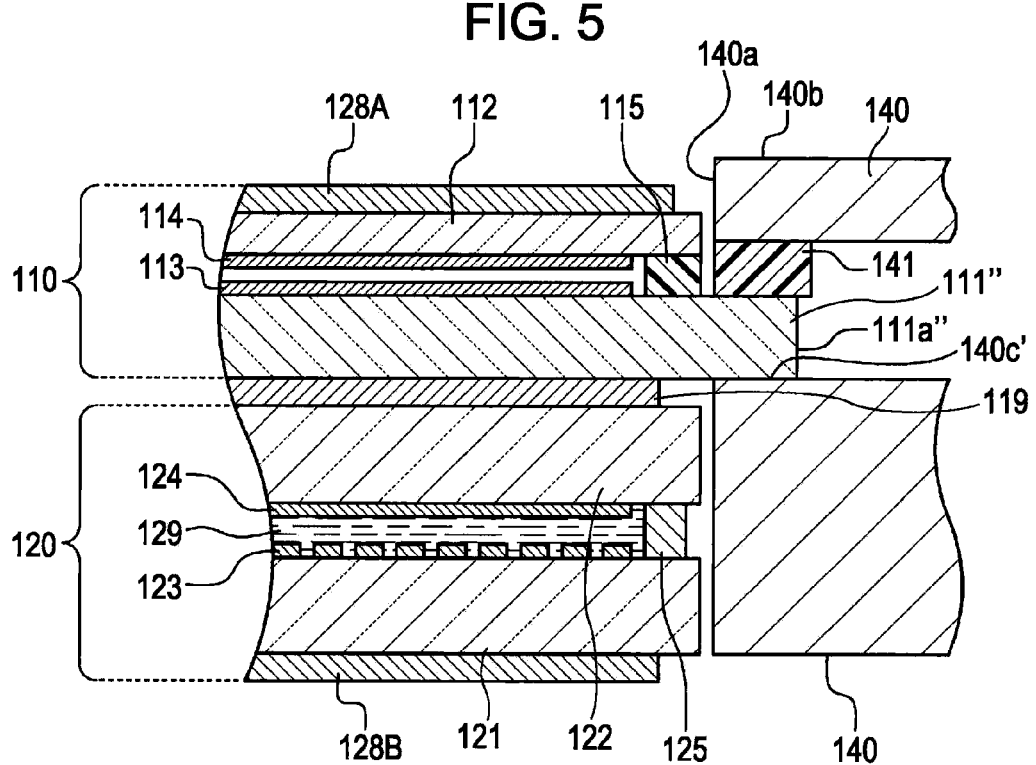
FIG. 5 is a schematic longitudinal cross-sectional view showing a part of a support structure of a touch panel of an electro-optical device according to a third embodiment of the invention.

Next, a touch panel device or an electro-optical device according to a third embodiment of the invention will be described with reference to FIG. 5. FIG. 5 is a schematic longitudinal cross-sectional view partially showing a part of a support structure of a touch panel of the electro-optical device according to the third embodiment. Here, a same reference sign is assigned to each part that is the same as that of the first embodiment or the second embodiment, and a description thereof will be omitted here.

According to the above-described second embodiment, as shown in FIG. 4, a support portion of the first substrate 111' that is supported by the opening edge portion 140b of the frame body 140 is arranged to the slightly inner side, and a support portion of the first substrate 111' that is supported by the opposite-side support portion 140c is arranged on the outer side relative to the support portion supported by the opening edge portion 140b. On the other hand, according to this third embodiment, as shown in FIG. 5, a support portion of a first substrate 111" that is supported by the opposite-side support portion 140c' is arranged so as to overlap with a support portion of the first substrate 111" that is supported by the opening edge portion 140b in the plan view. In other words, the opening edge portion 140b and the opposite-side support portion 140c' are arranged so as to face the front faces thereof with a extension outer edge portion 111a" of the first substrate 111" interposed therebetween. Here, it is apparent that the above-described two support portions are configured so as to coincide with each other in the plan view. At least parts of the two support portions are configured so as to be overlapped with each other in the plan view.

In addition, according to this embodiment, in order to form the above-described configuration, the position (the position of a cross section of outer edges of the substrates 121 and 122) of the outer edge of the liquid crystal panel 120 is designed so as to approximately coincide with the position of the outer edge of the second substrate 112 of the touch panel 110 in the plan view. In addition, the extension outer edge portion 111a" is configured so as to protrude on the side in the position of the outer edge. Then, the touch panel 110 is held by pinching the protruded portion of the extension outer edge portion 111a" by the opening edge portion 140b and the opposite-side support portion 140c'.

According to this third embodiment, the support faces of the opening edge portion 140b and the opposite-side support portion 140c' are configured so as to face each other on the front side. Accordingly, the same portion of the extension outer edge portion 111a" of the first substrate 111" of the touch panel 110 is configured to be pinched from both front and rear sides. In such a case, the advantages that are the same as those of the second embodiment can be acquired. In addition, application of bending stress to the first substrate 111 due to the positional deviation of the support portions from both the front and rear sides can be suppressed. Accordingly, the bending stress is decreased, and therefore resistance to impact, tolerance for deformation, and tolerance for other types of the external stress in the first substrate 111" can be improved substantially.

In addition, according to this third embodiment, the outer edge of the second substrate 112 of the touch panel 110 is configured so as to approximately coincide with the outer edge of the liquid crystal panel 120 in the plan view. As a result, the ranges of the detection area P and the display area Q that are shown in FIG. 2 can also be configured so as to approximately coincide with each other. Therefore, there is an advantage that the detection area P and the display area Q can be configured to be large while the external shape of the electro-optical device is miniaturized.

Fourth Embodiment

Figure 6:
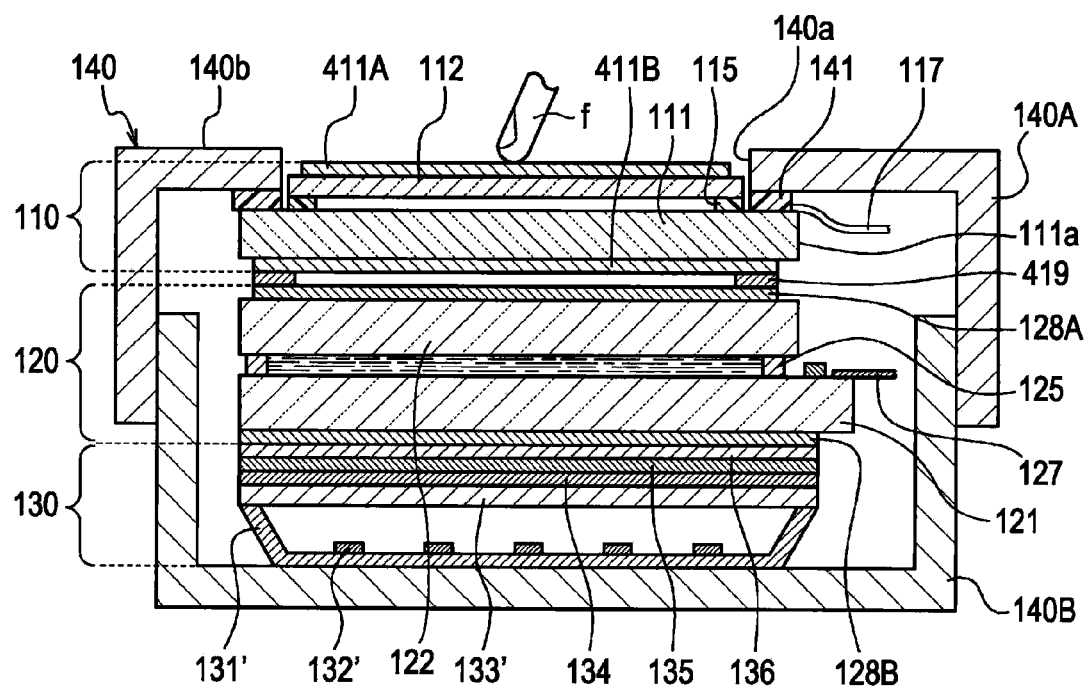
FIG. 6 is a schematic longitudinal cross-sectional view showing an electro-optical device according to a fourth embodiment of the invention.

Next, a touch panel device or an electro-optical device according to the fourth embodiment of the invention will be described with reference to FIG. 6. FIG. 6 is a schematic longitudinal cross-sectional view showing the electro-optical device according to the fourth embodiment. Here, a same reference sign is assigned to each part that is the same as that of the first embodiment, and a description thereof will be omitted here.

According to the first embodiment, the touch panel 110 and the liquid crystal panel 120 are fixed by an adhesive material 119 that is coated on the entire surface of the display area. However, according to this fourth embodiment, the touch panel 110 and the liquid crystal panel 120 are bonded together by a double-sided tape 419 that is attached in a circular shape.

Described in more details, as shown in FIG. 6, transparent protection sheets 411A and 411B are attached to outer faces of the first and second substrates 111 and 112 of the touch panel 110, and polarizing plates 128B and 128A are attached to the outer faces of the first and second substrates 121 and 122 of the liquid crystal panel 120. In addition, the protection sheet 411B of the touch panel 110 and the polarizing plate 128A of the liquid crystal panel 120 are bonded together by the double-sided tape 419.

Here, the double-sided tape 419 is arranged in a circular shape in the peripheral edge portions of the protection sheet 411B of the touch panel 110 and the polarizing plate 128A of the liquid crystal panel 120 along the outer edges thereof. Accordingly, a gap (air layer) is interposed between the touch panel 110 and the liquid crystal panel 120 on the inner side of the double-sided tape 419.

According to this embodiment, the touch panel 110 and the liquid crystal panel 120 are bonded so as to be fixed by arranging the double-sided tape 419. However, the touch panel 110 and the liquid crystal panel 120 do not need to be fixed. Thus, for example, the touch panel 110 may be configured to be supported by only the liquid crystal panel 120 from the side opposite to the observation side through any arbitrary member that is limited to the peripheral edge portion. Even in such a case, similar to this embodiment, the support range of the touch panel 110 that is supported by the liquid crystal panel 120 is limited to the peripheral edge portion.

In addition, on the lower side of the liquid crystal panel 120, a just-below-type back light 130 is arranged. The back light 130 is configured by arranging a plurality of light sources 132' on the bottom face of a light reflecting plate 131' in the vertical and horizontal directions and arranging a light diffusing plate 133' thereon by arranging gaps. In addition, on the light outgoing side of the light diffusing plate 133', various optical sheets that are formed of two prism sheets 134 and 135, an optical diffusing plate 136, and the like are arranged between the light diffusing plate 133' and the liquid crystal panel 120.

Similar to the first embodiment, the touch panel 110, the liquid crystal display device 120, and the back light 130 are housed inside the frame body 140 in the state being laminated. In this state, similarly to the first embodiment, the opening edge portion 140b of the frame body 140 supports the extension outer edge portion 111a of the first substrate 111 through the shock absorbing member 141 from the observation side in the touch panel 110, and the liquid crystal panel 120 supports the extension outer edge portion 111a of the first substrate through the double-sided tape 419 from the side opposite to the observation side, whereby the touch panel 110 is maintained in a state being pinched from both the front and rear sides. Also in this embodiment, the support portion of the opening edge portion 140b for the extension outer edge portion 111a, and the support portion of the first substrate 111 that is supported by the liquid crystal panel 120 through the double-sided tape 419 are at least partially overlap each other in the plan view.

This fourth embodiment shows an example of an electro-optical device that can be used for an electronic apparatus having a relatively large display screen such as a television set or a cash dispenser. However, according to the fourth embodiment, similarly to each one of the above-described embodiments, the damages or deformation in the second substrate 112 or the panel structure can be suppressed basically.

In addition, according to this embodiment, the support portion of the first substrate 111 that is supported by liquid crystal panel 120 is limited to the peripheral edge portion, that is, the extension outer edge portion 111a through the double-sided tape 419 or various members having a same planar shape as that of the double-sided tape 419. Accordingly, the influence of the external stress on the detection area P or the display area Q can be decreased further.

In addition, also according to this embodiment, the support portion of the opening edge portion 140b for the first substrate 111a and the support portion of the liquid crystal panel 120 for the first substrate through the double-sided tape 419 are arranged to face each other so as to be at least partially overlap each other in the plan view. Accordingly, the same advantages as those of the above-described third embodiment can be acquired.

Fifth Embodiment

Figure 7:
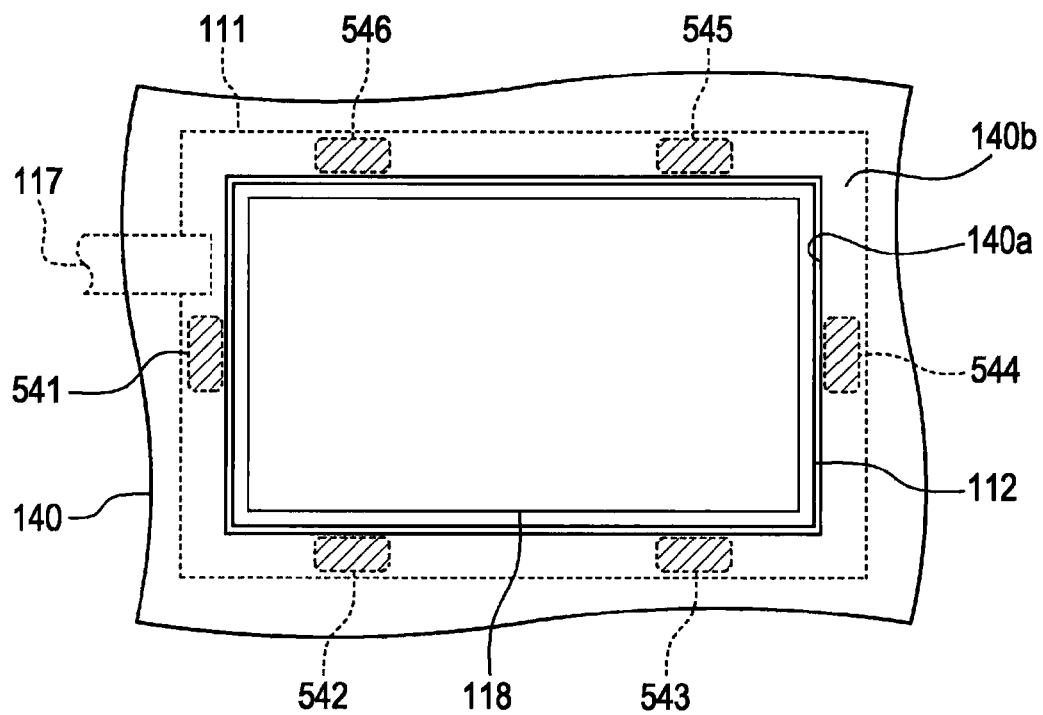
FIG. 7 is a schematic plan view schematically showing the state in which a display portion of an electro-optical device according to a fifth embodiment of the invention is viewed from the observation side.

Next, a touch panel device or an electro-optical device according to a fifth embodiment of the invention will be described with reference to FIG. 7. FIG. 7 is a schematic plan view schematically showing the state in which the display portion of the electro-optical device according to the fifth embodiment is viewed from the observation side. Here, a same reference sign is assigned to each part that is the same as that of the first embodiment, and a description thereof will be omitted here.

According to the first embodiment, as shown in FIG. 1, the shock absorbing member 141 is integrally formed approximately in the shape of the letter "C". As a result, the support portion of the opening edge portion 140b for the extension outer edge portion 111a is also formed integrally. However, according to this embodiment, as shown in FIG. 7, a plurality of approximately rectangular shaped shock absorbers 541, 542, 543, 544, 545, and 546 is arranged on the periphery of the second substrate 112 in a scattered manner. In other words, according to this embodiment, a plurality of the support portions of the opening edge portion 140b for the extension outer edge portion 111a is arranged in a scattered manner.

Described in more detail, the support portions are arranged on both-side outer edges of the touch panel 110 that face each other. In addition, the above-described portions are arranged so as to be scattered in at least three spots on the peripheral edge of the touch panel 110. By configuring as described above, the touch panel 110 can be supported more stably and assuredly even when the support portions do not form a shape that is extended along the outer edge of the touch panel 110, unlike the first embodiment. In particular, as in the example shown the figure, by arranging the above-described support portions on each side of the touch panel 110 having a rectangular shape in the plan view, the stability of support of the touch panel 110 can be improved further.

Electronic Apparatus

Figure 8:
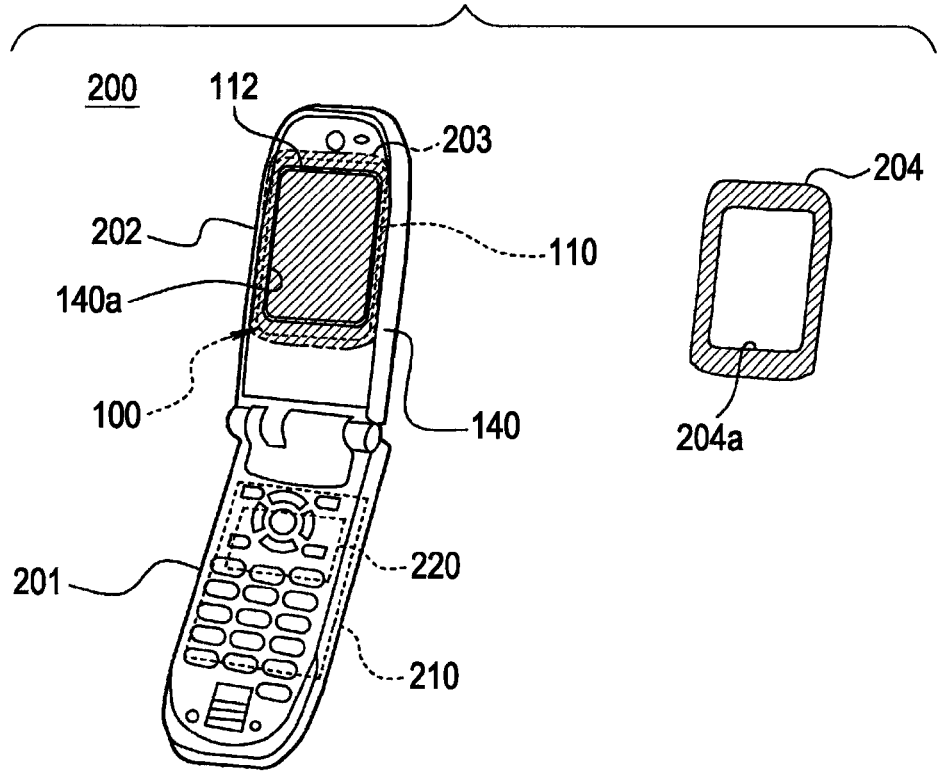
FIG. 8 is a schematic perspective view schematically showing a cellular phone according to an embodiment of the invention.

FIG. 8 shows an external appearance of a cellular phone as an electronic apparatus according to an embodiment of the invention. This cellular phone 200 includes an operation unit 201 and a display unit 202. In this display unit 202, the electro-optical device 100 having the configuration described in each of the above-described embodiments is configured. This electro-optical device 100 includes a frame body 140 that forms at least a part of a case (exterior case) of the display unit 202. Inside this frame body 140, the touch panel 110, the liquid crystal panel 120, and the back light 130 are sequentially arranged from the observation side towards the opposite side. The surface (second substrate 112) of the touch panel 110 is configured so as to be exposed from the opening portion 140a of the frame body 140.

The touch panel 110, the liquid crystal panel 120, and the back light 130 of the electro-optical device 100 are connected to a display control circuit 220 that is formed in a circuit substrate 210 arranged inside the operation unit 201. This display control circuit 220 includes a position detecting circuit unit that is connected to the touch panel 110 and is used for detecting the position coordinates based on the state of the touch panel 110, a display control circuit unit that is connected to a driving circuit, not shown in the figure, that drives the liquid crystal panel 120 and is used for displaying a specific image in the liquid crystal panel 120, and an illumination control circuit unit that is connected to the back light 130 and turns on the light source.

The electro-optical device 100 of this cellular phone 200 has the configuration shown in each of the above-described embodiments. Thus, even when the cellular phone 200 falls on the floor or the like, the stress generated between the frame body 140 and the touch panel 110 due to the impact is received by the first substrate 111. Accordingly, the damage of the second substrate 112 or the deformation of the touch panel 110, or the like can be suppressed.

According to this embodiment, when a problem in the external appearance and protection of the touch panel 110 due to exposure of the entire second substrate 112 of the touch panel 110 inside the opening portion 140a may occur, for example, a transparent film 203 having flexibility that is represented by a dashed-two dotted line shown in FIG. 8 may be mounted (attached) on the opening portion 140a and the opening edge portion 140b. In addition, instead of this transparent film 203, an outer edge frame (film) 204 having the opening portion 204a shown in the figure may be mounted (attached). This outer edge frame 204 covers the entire periphery of the range from the outer edge of the second substrate 112 to the opening edge portion 140b. The outer edge frame 204, differently from the transparent film 203, does not block an operation for the detection area or visibility of the display area by having the opening portion 204a. Accordingly, the outer edge frame 204 may be formed from a non-transparent material or a hard material.

In addition, the invention is not limited to the above-described examples shown in the figures. Thus, it is apparent that various changes may be made therein within the scope not departing from the basic idea of the invention. For example, according to the first to fifth embodiments, the frame body 140 supports the first substrate 111, 111', or 111" of the touch panel 110, 210, 310, and 410 through the shock absorbing member 141, 541, 542, 543, 544, 545, or 546. However, the opening edge portion 140b of the frame body 140 may be configured to be directly brought into contact with the first substrate. Alternatively, a member other than the shock absorbing member such as a sealing member that is a packing or the like, an adhesive agent, or a spacer formed of a metal plate, a resin plate, or the like may be configured to be interposed between the opening edge portion 140b of the frame body 140 and the first substrate.

In addition, in the second embodiment or the third embodiment, the shock absorbing member or a member other than the shock absorbing member 141 may be arranged between the first substrate 111 of the touch panel 110 and the opposite-side support portion 140c or 140c' of the frame body 140.

The entire disclosure of Japanese Patent Application No. 2008-285079, filed Nov. 6, 2008 is expressly incorporated by reference herein.

What is claimed is:

1. A touch panel device comprising:
a touch panel that includes a first substrate, a second substrate that is arranged so as to face the first substrate from a user side with a gap interposed therebetween, the first and second substrates being directly bonded to each other via a sealing member positioned therebetween, an extension outer edge portion that is arranged in the first substrate and extends to an outer side relative to an outer edge portion of the second substrate, and a position detecting structure that is arranged in an area in which the first substrate and the second substrate overlap each other; and
a frame body that includes an opening portion used for exposing the second substrate of the touch panel,
wherein the extension outer edge portion extends to the outer sides relative to at least two outer edge portions of the second substrate facing each other,
wherein an opening edge portion of the opening portion is overlapped with and positioned above the extension outer edge portion and without overlapping the second substrate in the outer sides relative to the at least two outer edge portions of the second substrate facing each other, and
wherein the opening edge portion directly or indirectly supports the extension outer edge portion from the user side without supporting the second substrate.

2. The touch panel device according to claim 1, wherein the rigidity of the first substrate is higher than that of the second substrate.

3. The touch panel device according to claim 1,
wherein the opening edge portion directly or indirectly supports the extension outer edge portion on the outer sides relative to the at least two outer edge portions of the second substrate facing each other.

4. The touch panel device according to claim 1, further comprising an opposite-side support portion that supports the extension outer edge portion on the side opposite to the operation side and is formed to be integrated with or separated from the frame body.

5. The touch panel device according to claim 1, wherein the second substrate is supported by the first substrate without being supported by the frame body.

6. The touch panel device according to claim 1, further comprising a polarizing plate formed on the second substrate.

7. The touch panel device according to claim 1, further comprising first and second transparent conductive films formed directly on and between the first and second substrates, respectively.

8. The electro-optical device according to claim 1, further comprising a polarizing plate formed on the second substrate.

9. The electro-optical device according to claim 1, further comprising first and second transparent conductive films formed directly on and between the first and second substrates, respectively.

10. An electro-optical device comprising:
a touch panel that includes a first substrate, a second substrate that is arranged so as to face the first substrate from a user side with a gap interposed therebetween, the first and second substrates being directly bonded to each other via a sealing member positioned therebetween, an extension outer edge portion that is arranged in the first substrate and extends to an outer side relative to an outer edge portion of the second substrate, and a position detecting structure that is arranged in an area in which the first substrate and the second substrate are overlapped with each other;
an electro-optical panel that is arranged on the first substrate side of the touch panel; and
a frame body that includes an opening portion used for exposing the second substrate of the touch panel,
wherein the extension outer edge portion extends to the outer sides relative to at least two outer edge portions of the second substrate facing each other,
wherein an opening edge portion of the opening position is overlapped with and positioned above the extension outer edge portion and without overlapping the second substrate in the outer sides relative to the at least two outer edge portions of the second substrate facing each other, and wherein the opening edge portion directly or indirectly supports the extension outer edge portion from the user side without supporting the second substrate.

11. The electro-optical device according to claim 10, wherein the rigidity of the first substrate is higher than that of the second substrate.

12. The electro-optical device according to claim 10, wherein the opening edge portion directly or indirectly supports the extension outer edge portion on the outer sides relative to the at least two outer edge portions of the second substrate facing each other.

13. The electro-optical device according to claim 10, wherein the first substrate is directly or indirectly supported by the electro-optical panel from the side opposite to the operation side.

14. The electro-optical device according to claim 10, further comprising an opposite-side support portion that supports the extension outer edge portion on the side opposite to the operation side and is formed to be integrated with or separated from the frame body, wherein the extension outer edge portion is extends the outer side relative to the outer edge of the electro-optical panel.

15. The electro-optical device according to claim 14, wherein a support portion of the extension outer edge portion that is supported by the opening edge portion and a support portion of the extension outer edge portion that is supported by the opposite-side support portion are at least partially overlap each other in the plan view.

16. An electronic apparatus comprising:
the electro-optical device according to claim 10; and
a control unit that controls the electro-optical device.

17. The electro-optical device according to claim 10, wherein the second substrate is supported by the first substrate without being supported by the frame body.

* * * * *